July 4, 1961
A. VANWERSCH ET AL
2,991,100
CONNECTING STRUCTURE FOR BEAMS OF
A ROOF SUPPORT OR THE LIKE
Original Filed May 23, 1955
2 Sheets-Sheet 1
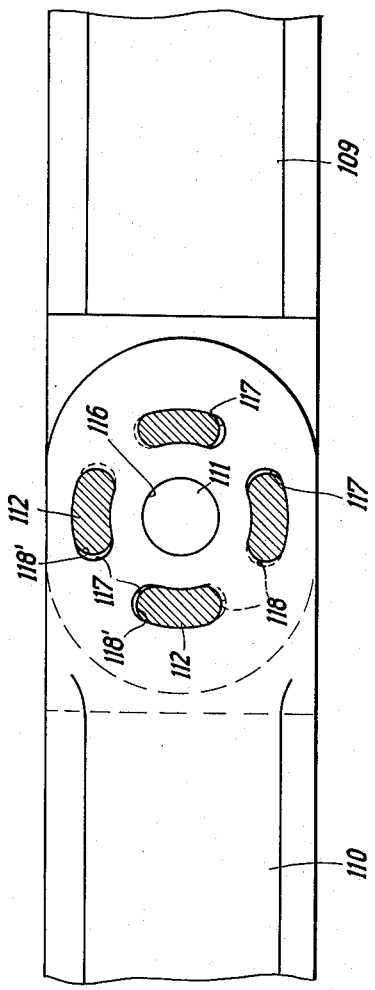
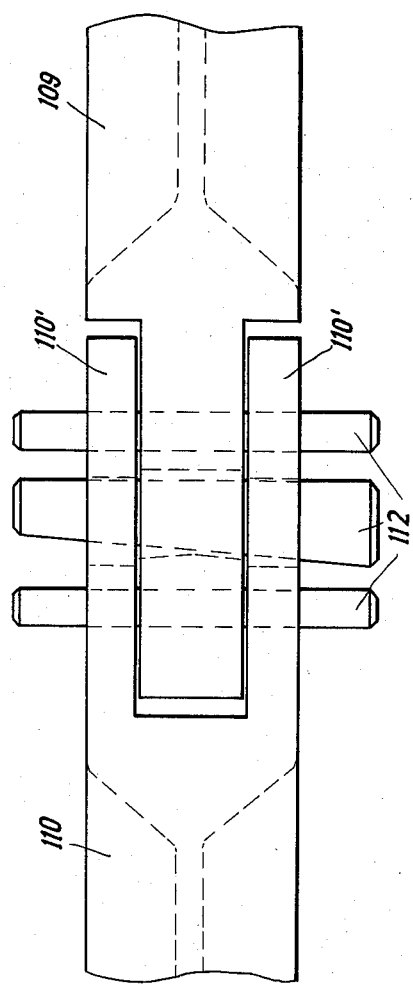

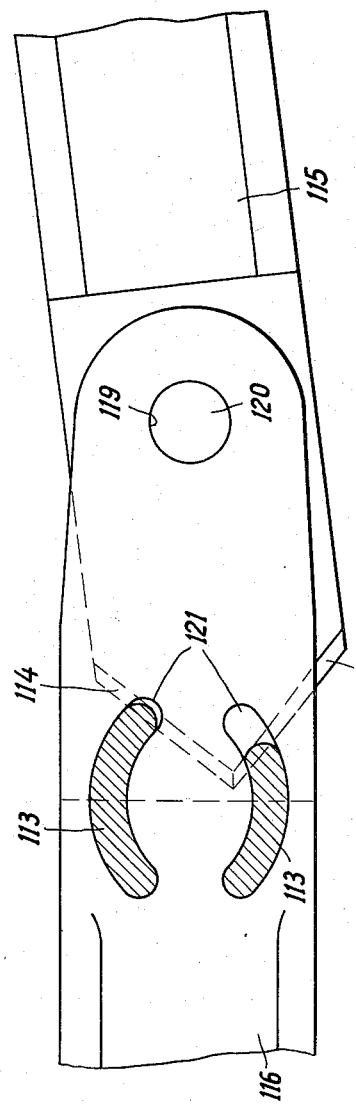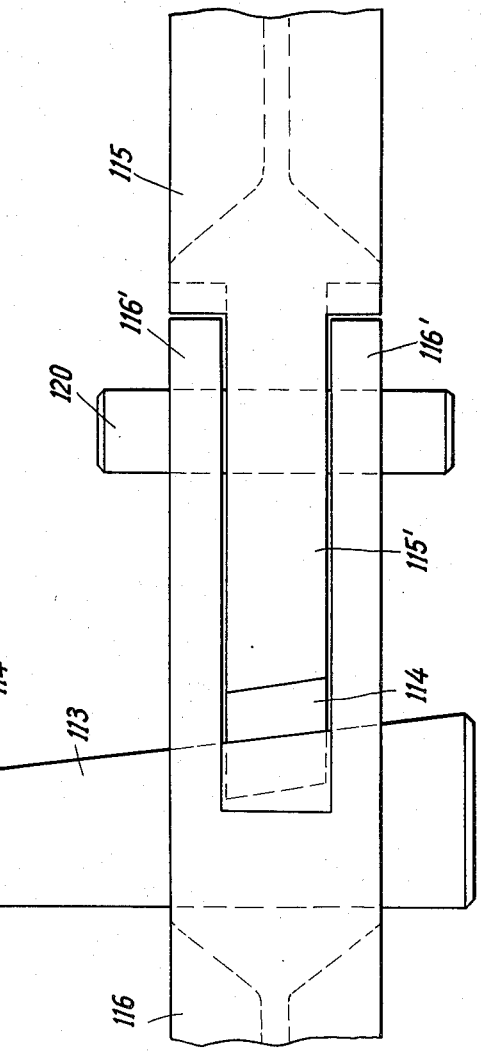

United States Patent Office 2,991,100
Patented July 4, 1961

2,991,100
CONNECTING STRUCTURE FOR BEAMS OF A ROOF SUPPORT OR THE LIKE
Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204. Divided and this application Dec. 24, 1958, Ser. No. 782,854
In France July 8, 1948
Public Law 619, Aug. 23, 1954
Patent expires July 8, 1968
5 Claims. (Cl. 287—99)

This application is a divisional application of our copending application Serial No. 510,204, filed on May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

According to another feature of the invention, the openings through which the wedge members extend are of arcuate shape and the wedge members also are of arcuate section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a fragmentary side elevational view illustrating one possible manner of interconnecting a pair of beams;

FIG. 2 is a top plan view of the structure shown in FIG. 1;

FIG. 3 is a fragmentary side elevational view of another embodiment of the present invention; and FIG. 4 is a top plan view of the structure shown in FIG. 3.

Referring now to the drawing, it will be seen that the beam 110 as shown in FIGS. 1 and 2 has a bifurcated end portion provided with a pair of spaced walls 110', 110' between which the end portion of beam 109 freely extends. The beams 109 and 110 are supported in a known way by suitable props not shown in the drawing and serving to hold the beams against the roof of a mine shaft or the like. The walls 110' of the end portion of beam 110 and the end portion 109 are respectively formed with openings 116 which are aligned and through which a pivot pin 111 extends so that in this way the beams 109 and 110 are pivotally connected for angular movement with respect to each other. Through such angular movement of the beams it is possible to arrange them so that they correspond to the contour of a particular roof to be supported.

The spaced walls 110' of the end portion of beam 110 are further formed with four sets of aligned arcuate openings 117 distributed substantially equidistant from pivot pin 111 and the end portion of beam 109 is likewise formed with four additional openings 118 of substantially the same configuration as opening 117 and distributed about pivot pin 111 so as to be respectively alignable with the openings 117. In the position of beams 109 and 110 as shown in FIG. 1 openings 117 are angularly offset to a small degree with respect to openings 118. Four wedge members 112 of arcuate cross section are inserted through the aligned openings 117, respectively, and abut thereby against abutment faces 118' of the openings 118 to lock the beams in a predetermined angular position depending on the extent wedge members 112 are driven through the openings. If desired, straps may interconnect pivot pin 111 with wedge member 112.

In order to prevent undesired distortion of the wedge members in a vertical direction as well as to secure a proper engagement between the wedge members and the surfaces cooperating therewith, an arrangement as shown in FIGS. 3 and 4 may be used. According to FIGS. 3 and 4, the beam 115 has a V-shaped end provided with oppositely inclined abutment faces 114 and extends between the spaced walls 116', 116' of the bifurcated end portion of the other beam 116, these beams being pivotally interconnected in the same way as in the embodiment illustrated in FIG. 1, that is, the spaced walls 116' of the end portion of beam 116 and the end portion 115' of beam 115 received between wall 116' are respectively formed with aligned openings 119 through which a pivot pin 120 extends. Beam 116 is formed in each of the spaced walls 116' of its bifurcated end portion with a pair of additional openings 121 of elongated arcuate configuration, which receive arcuate wedge members 113 being curved to the same radius of curvature as the openings 121 and tapering in a direction transverse to the axis of the beams 115, 116. As is obvious from FIG. 3, the abutment faces 114 extend when beams 115 and 116 are aligned with each other in part transversely across openings 113, respectively, and when beam 115 turns about pivot pins 120 to the position shown in FIG. 3, the lower of the abutment faces 114 moves to an increasing extent over the lower of the openings 113, while the upper abutment face 114 moves to open the upper opening 113 to an increasing extent. Wedge members 113 engage the oppositely inclined abutment faces 114 of the V-shaped end as shown in FIG. 3 to lock the beams in a desired angular position.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supporting structure, in combination, a first beam having a bifurcated end portion provided with a pair of spaced walls each of which is formed with a pivot opening, said opening in one of said walls being aligned with that in said other wall; a second beam having an end portion freely extending between said spaced walls and formed with a pivot opening aligned with said pivot openings in said walls; a pivot pin extending through said openings, the end portion of one of said beams being formed with a plurality of additional openings spaced from said pivot opening in said end portion, the end portion of the other one of said first and second beams being formed with a plurality of abutment faces, said abutment faces respectively extending, when said beams are aligned with each other, at least in part transversely across said additional openings and said additional openings being arranged in such a manner that during turning of the other beam in one direction about said pivot one of said abutment faces moves to an increasing extent over one of said additional openings whereas the other of said abutment faces moves to open the other of said additional openings to an increasing extent; and a plurality of wedge members respectively extending through said plurality of additional openings and abutting against said plurality of abutment faces.

2. In a supporting structure, in combination, a first beam having a bifurcated end portion provided with a pair of spaced walls each of which is formed with a pivot opening, said opening in one of said walls being aligned with that in said other wall; a second beam having an end portion freely extending between said spaced walls and formed with a pivot opening aligned with said pivot openings in said walls; a pivot pin extending through said openings, the end portion of one of said beams being formed with a plurality of additional arcuate openings spaced from said pivot opening in said end portion, the end portion of the other one of said first and second beams being formed with a plurality of abutment faces, said abutment faces respectively extending, when said beams are aligned with each other, at least in part transversely across said additional openings and said additional openings being arranged in such a manner that during turning of the other beam in one direction about said pivot one of said abutment faces moves to an increasing extent over one of said additional openings whereas the other of said abutment faces moves to open the other of said additional openings to an increasing extent; and a plurality of wedge members of arcuate cross section respectively extending through said plurality of additional openings and abutting against said plurality of abutment faces.

3. In a supporting structure, in combination, a first beam having a bifurcated end portion provided with a pair of spaced walls each of which is formed with a central opening and with a plurality of additional openings distributed about said central opening and each spaced a given radial distance from said central opening, said openings of one wall being aligned with those of the other wall; a second beam having an end portion extending between said spaced walls, formed with a central opening aligned with said central openings of said spaced walls; a pivot pin extending through said aligned central openings, said second beam being formed with a plurality of additional openings respectively spaced said radial distance from said central opening and being alignable with said additional openings in said spaced walls in a selected angular position of said beams to each other; and a plurality of wedge members respectively extending through said sets of additional openings.

4. In a supporting structure, in combination, a first beam having a bifurcated end portion provided with a pair of spaced walls each of which is formed with a central opening and with a plurality of additional arcuate openings distributed about said central opening, and each spaced a given radial distance from said central opening, said openings of one wall being aligned with those of the other wall; a second beam having an end portion extending between said spaced walls, formed with a central opening aligned with said central openings of said spaced walls; a pivot pin extending through said aligned central openings, said second beam being formed with a plurality of additional openings respectively spaced said radial distance from said central opening and being alignable with said additional openings in said spaced walls in a selected angular position of said beams to each other; and a plurality of wedge members of arcuate cross section respectively extending through said sets of additional openings.

5. In a supporting structure, in combination, a first beam having a bifurcated end portion provided with a pair of spaced walls each of which is formed with a pair of opposed elongated arcuate openings extending spaced from each other substantially in direction of said first beam and with a third opening located nearer to the extremity of said end portion than said arcuate openings, the openings of one wall being aligned with those of the other wall; a second beam having an end portion extending between said spaced walls, formed with an opening aligned with said third openings of said walls, and terminating in a substantially V-shaped end having its apex between said arcuate openings and being provided with oppositely inclined abutment faces respectively located adjacent said pairs of arcuate openings; a pivot pin extending through said opening of said second beam and said third openings of said first beam; and a pair of channel-shaped wedge members respectively extending through said pairs of aligned openings of said spaced walls and engaging said oppositely inclined abutment faces of said second beam.

References Cited in the file of this patent

FOREIGN PATENTS 1,009,905   France _____ Mar. 12, 1952